United States Patent
Asai

(10) Patent No.: US 9,479,763 B2
(45) Date of Patent: Oct. 25, 2016

(54) IMAGE DISPLAY APPARATUS

(71) Applicant: PANASONIC CORPORATION, Osaka (JP)

(72) Inventor: Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

(21) Appl. No.: 14/321,505

(22) Filed: Jul. 1, 2014

(65) Prior Publication Data
US 2015/0085088 A1    Mar. 26, 2015

(30) Foreign Application Priority Data

Sep. 20, 2013 (JP) .................. 2013-196098
May 19, 2014 (JP) .................. 2014-103635

(51) Int. Cl.
H04N 13/04 (2006.01)

(52) U.S. Cl.
CPC ...... *H04N 13/0409* (2013.01); *H04N 13/0404* (2013.01); *H04N 13/0415* (2013.01); *H04N 13/0452* (2013.01)

(58) Field of Classification Search
CPC .................. H04N 13/0225; H04N 13/0409; H04N 13/0411; H04N 13/0413; H04N 13/0415
See application file for complete search history.

(56) References Cited

U.S. PATENT DOCUMENTS

| 2007/0195410 A1 | 8/2007 | Yun et al. |
| 2010/0182520 A1 | 7/2010 | Yun et al. |
| 2010/0238277 A1 | 9/2010 | Takahashi et al. |
| 2011/0181827 A1 | 7/2011 | Takahashi et al. |
| 2012/0069255 A1 | 3/2012 | Takagi et al. |
| 2012/0120331 A1 | 5/2012 | Oka et al. |
| 2012/0200677 A1* | 8/2012 | Saishu ............... G02B 27/225 348/51 |
| 2012/0242913 A1 | 9/2012 | Miyazawa et al. |
| 2012/0257127 A1 | 10/2012 | Miyazawa et al. |
| 2012/0293503 A1 | 11/2012 | Miyazawa et al. |
| 2013/0208356 A1 | 8/2013 | Saito |

FOREIGN PATENT DOCUMENTS

| JP | 2007-226231 A | 9/2007 |
| JP | 2010-211036 A | 9/2010 |
| JP | 2011-154197 A | 8/2011 |
| JP | 2012-053432 A | 3/2012 |
| JP | 2012-108194 A | 6/2012 |
| JP | 2012-128351 A | 7/2012 |
| JP | 2012-163709 A | 8/2012 |
| JP | 2012-198435 A | 10/2012 |

(Continued)

*Primary Examiner* — Christopher Findley
(74) *Attorney, Agent, or Firm* — McDermott Will & Emery LLP

(57) ABSTRACT

An image display apparatus capable of displaying a 3D image includes: an image display section including partition regions partitioned in a row direction and a column direction; a display control section; and a light control section arranged at a front surface side of the image display section and including a plurality of separation elements each configured to separate light of the right eye image and light of the left eye image in displaying the 3D image. Each separation element is arranged so as to extend linearly and be tilted with respect to the column direction, and an arrangement pitch of the separation element in the row direction is non-integer times that of an arrangement pitch of the partition region in the row direction, the integer times being less than 4.5 times.

3 Claims, 13 Drawing Sheets

(56) References Cited

FOREIGN PATENT DOCUMENTS

| | | |
|---|---|---|
| JP | 2012-220719 A | 11/2012 |
| JP | 2012-242681 A | 12/2012 |
| JP | 2012-242809 A | 12/2012 |
| WO | 2011036736 A1 | 3/2011 |

* cited by examiner

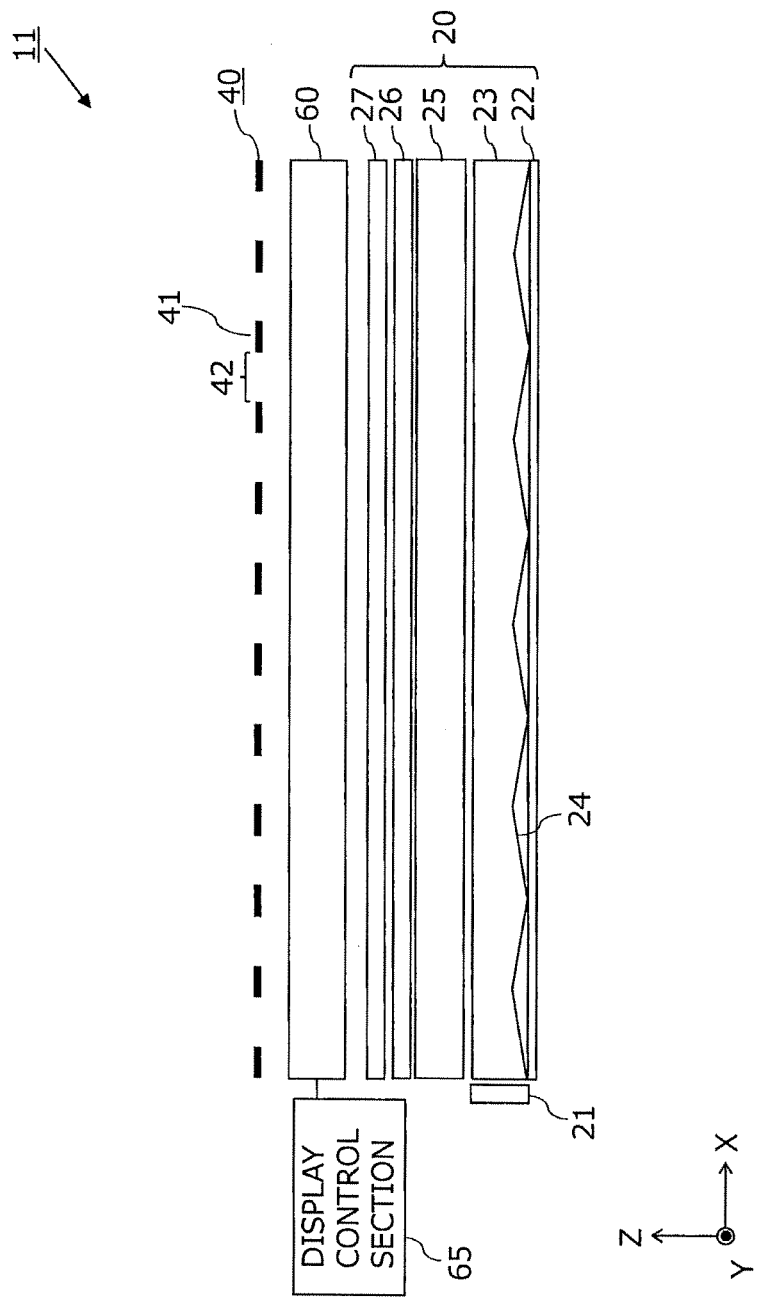

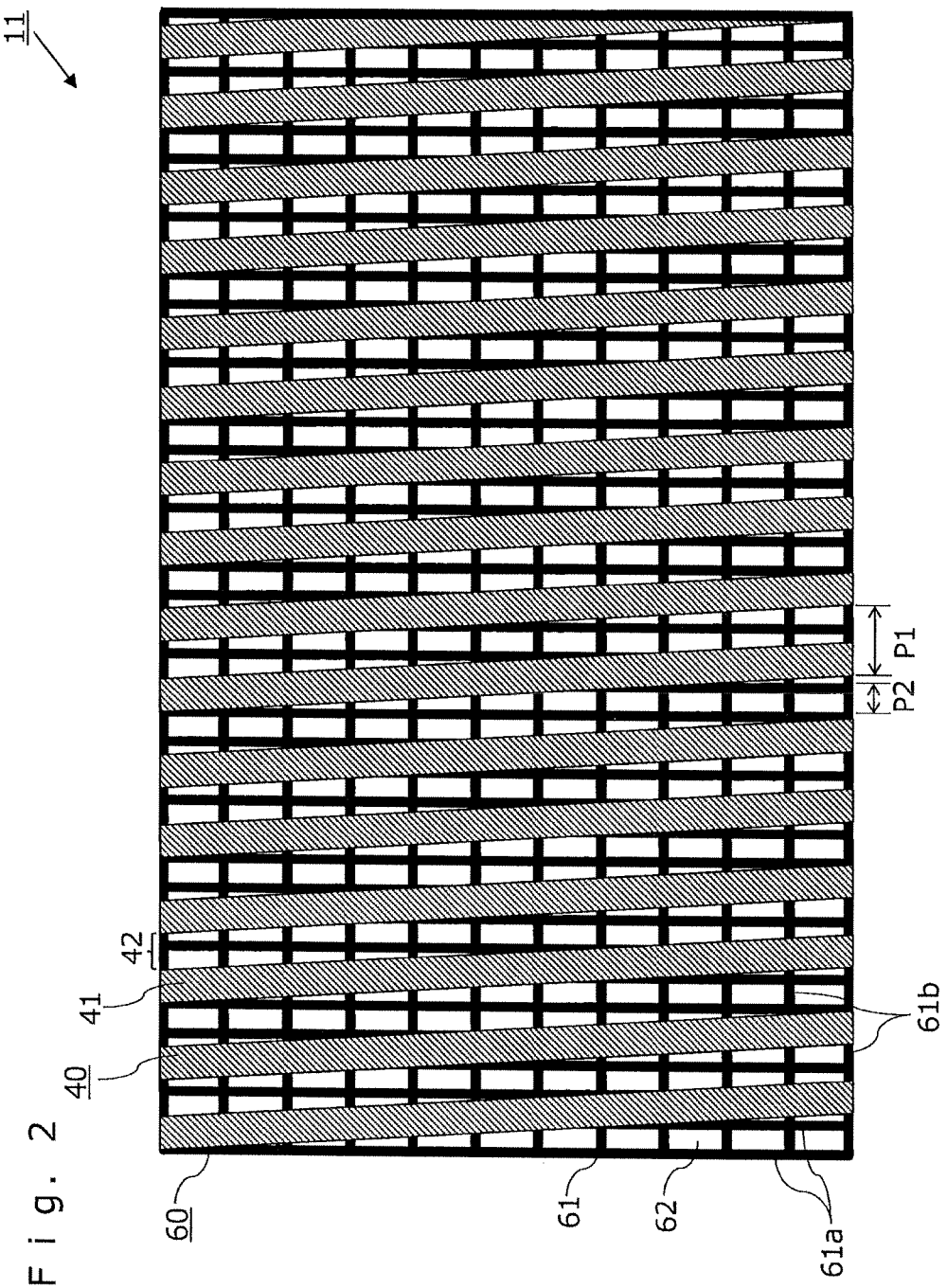

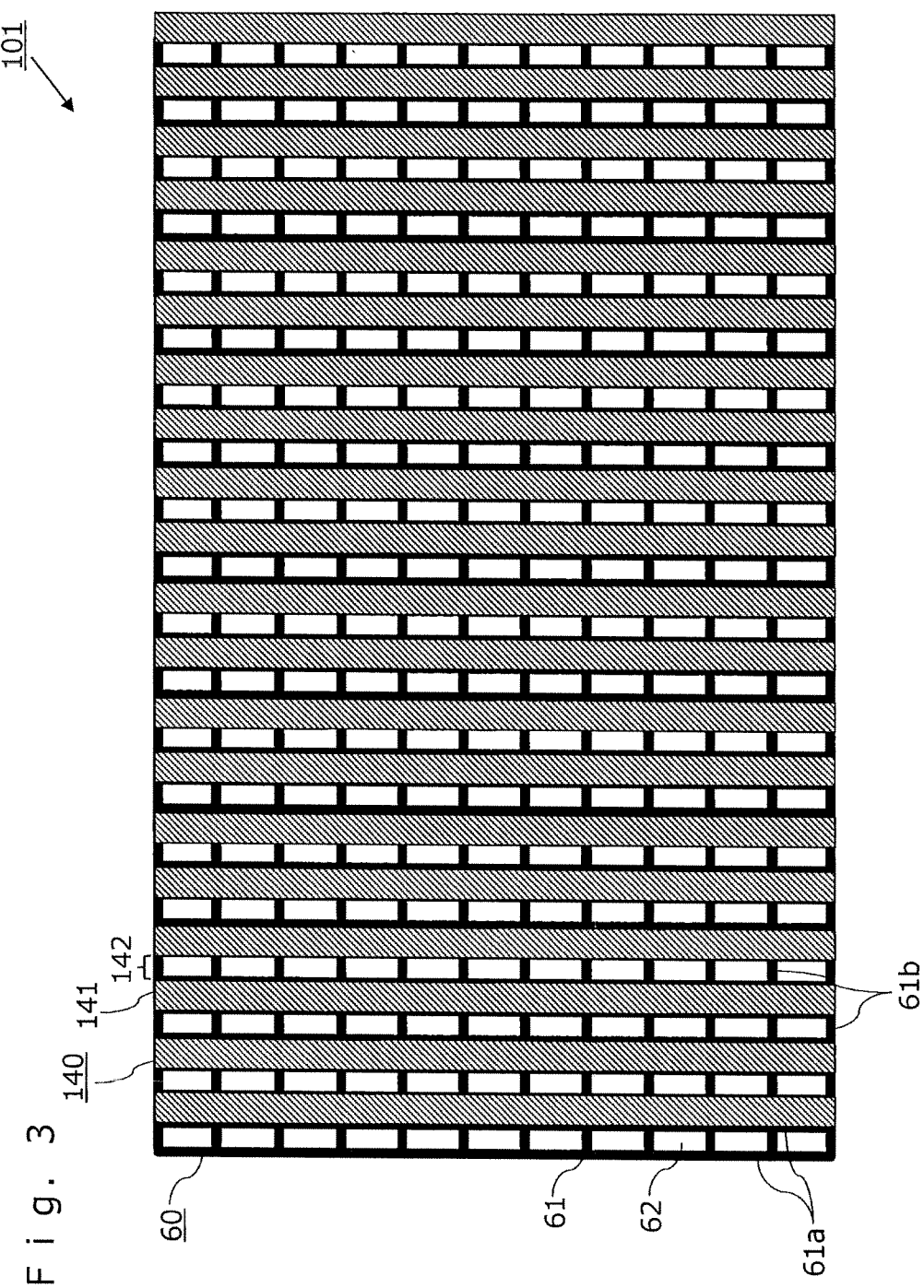

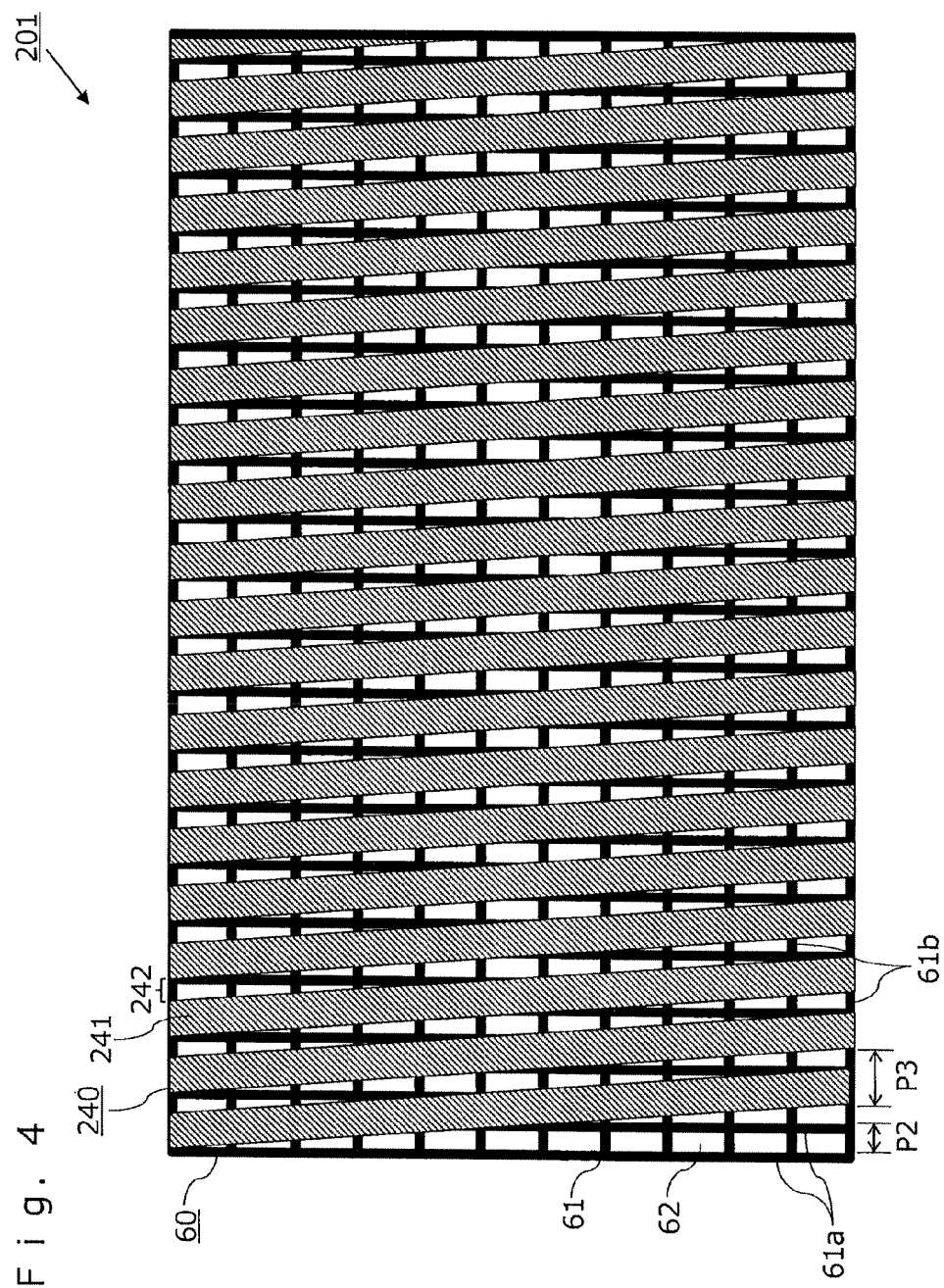

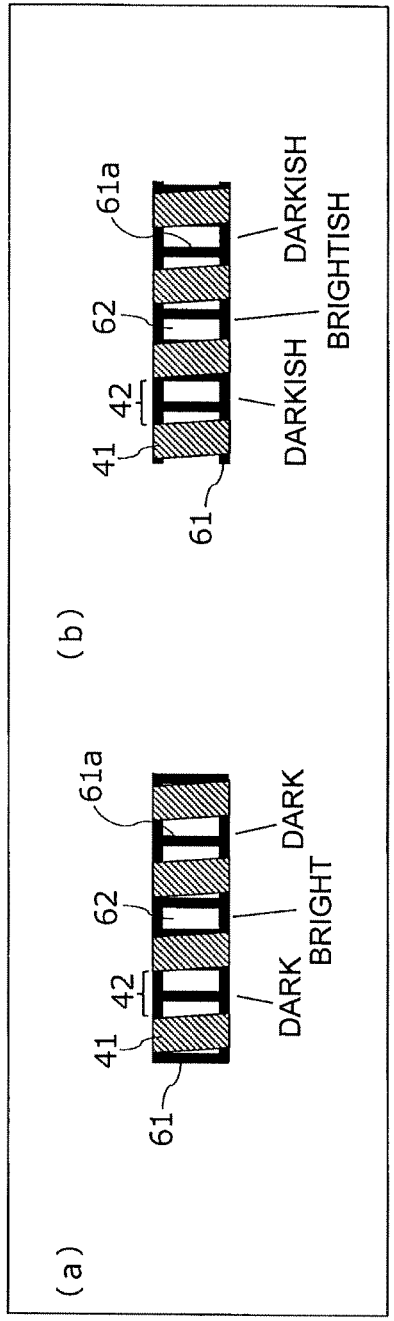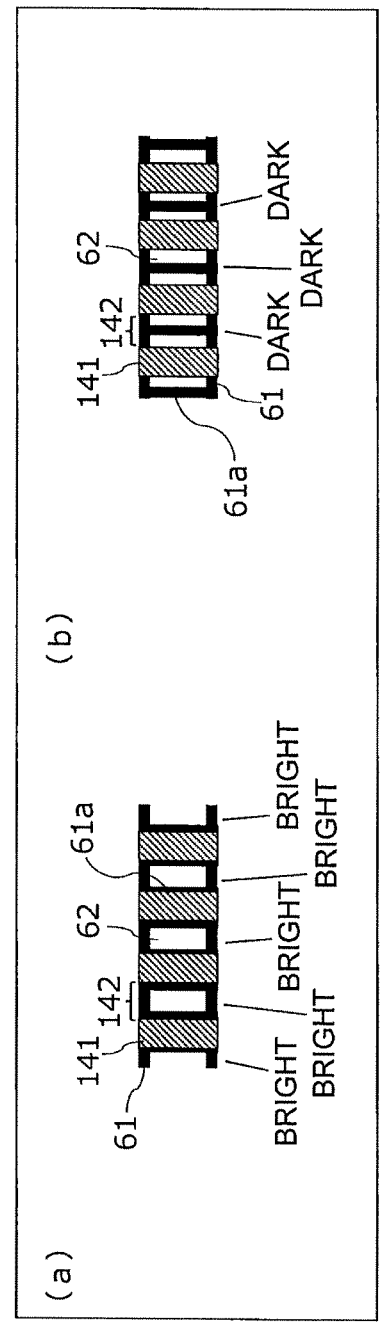

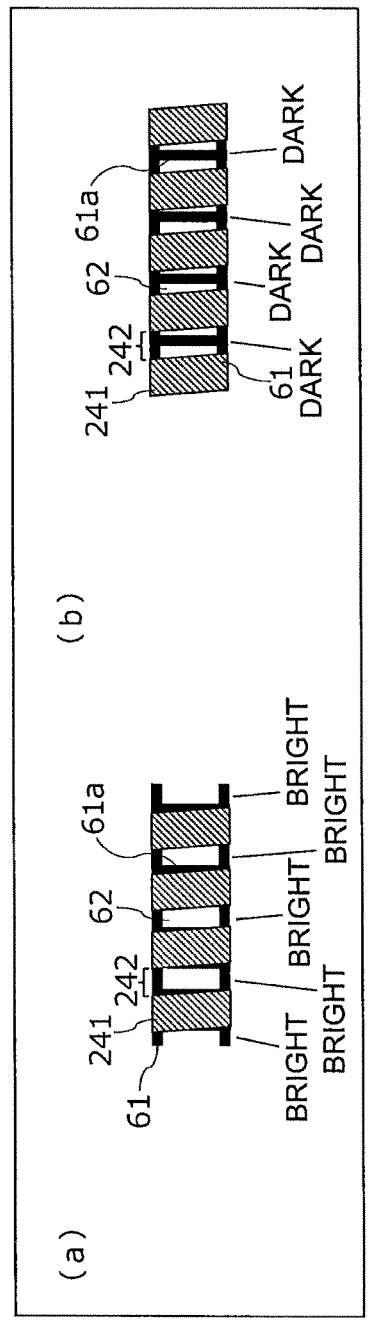

IMAGE DISPLAY APPARATUS

RELATED APPLICATIONS

This application claim the benefit of Japanese Patent Application No. 2013-196098, filed on Sep. 20, 2013 and Japanese Patent Application No. 2014-103635, filed on May 19, 2014, the disclosures of which Applications are incorporated by reference herein.

BACKGROUND

1. Field

The present disclosure relates to an image display apparatus that allows for stereoscopic viewing with naked eyes.

2. Description of the Related Art

An image display apparatus is disclosed in Japanese Laid-Open Patent Publication No. 2012-53432.

Japanese Laid-Open Patent Publication No. 2012-53432 discloses a stereoscopic image display apparatus that allows for stereoscopic viewing by a parallax barrier system. The stereoscopic image display apparatus disclosed in Japanese Laid-Open Patent Publication No. 2012-53432 includes: a display module in which first pixels which display an image in a first direction and second pixels which display an image in a second direction are arranged alternately in a horizontal direction; and a bather module which is spaced apart from the display module by a determined distance and controls driving of a barrier having oblique patterns arranged such that the left eye and the right of a viewer selectively see the first pixels and the second pixels, respectively. The barrier having the oblique patterns prevents moiré interference.

SUMMARY

The present disclosure provides an image display apparatus that allows for improvement of the quality of a 3D image.

An image display apparatus capable of displaying a 3D image according to the present disclosure includes: an image display section including partition regions forming a plurality of pixels partitioned in a row direction and a column direction by a grid-shaped black matrix; a display control section configured to cause the image display section to simultaneously display a right eye image and a left eye image thereon in displaying the 3D image; and a light control section arranged at a front surface side of the image display section and including a plurality of separation elements each configured to separate light of the right eye image and light of the left eye image emitted from the image display section in displaying the 3D image. Each separation element is arranged so as to extend linearly and so as to be tilted with respect to the column direction. An arrangement pitch of the separation element in the row direction is non-integer times that of an arrangement pitch of the partition region in the row direction, the non-integer times being less than 4.5 times.

The image display apparatus according to the present disclosure is effective for improving the quality of a 3D image.

BRIEF DESCRIPTION OF THE DRAWINGS

FIG. 1 is a schematic cross-sectional view of an image display apparatus according to Embodiment 1;

FIG. 2 is a front view showing a relationship between an image display panel and a parallax barrier shown in FIG. 1;

FIG. 3 is a front view showing a relationship between an image display panel and a parallax barrier in an image display apparatus according to Comparative Example 1;

FIG. 4 is a front view showing a relationship between an image display panel and a parallax barrier in an image display apparatus according to Comparative Example 2;

FIG. 5 is a diagram showing a pattern of a black matrix seen through openings of the parallax barrier when the image display apparatus according to Embodiment 1 is seen;

FIG. 6 is a diagram showing a pattern of a black matrix seen through openings of the parallax barrier when the image display apparatus according to Comparative Example 1 is seen;

FIG. 7 is a diagram showing a pattern of a black matrix seen through openings of the parallax barrier when the image display apparatus according to Comparative Example 2 is seen;

DETAILED DESCRIPTION

Figure 8:
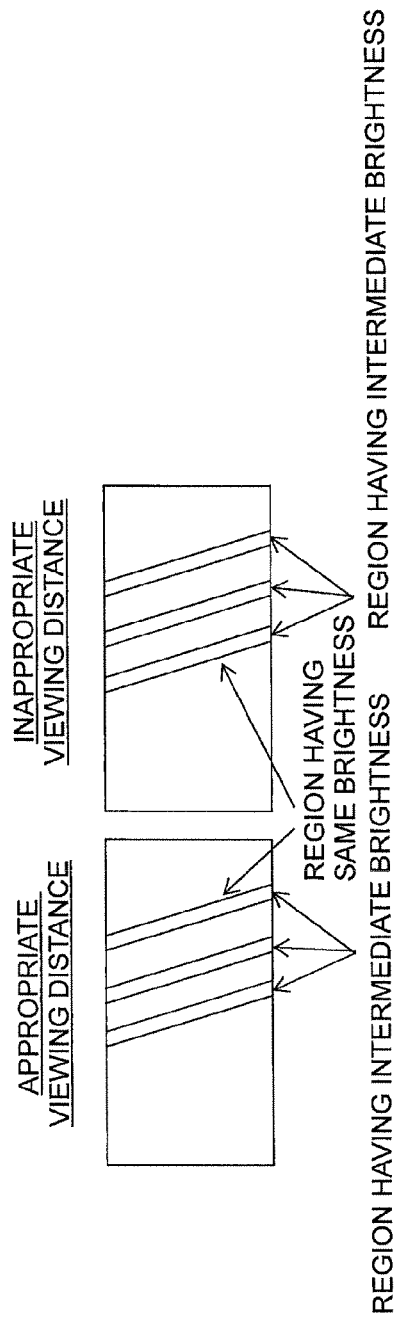
FIG. 8 is a schematic diagram showing a brightness distribution appearing on a display surface of the image display apparatus according to Embodiment 1.

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventor provides the following description and the accompanying drawings in order to allow a person of ordinary skill in the art to sufficiently understand the present disclosure, and the description and the drawings are not intended to restrict the subject matter of the scope of the patent claims.

In the following description, a three-dimensional orthogonal coordinate system is set for an image display apparatus, and a direction is specified by using the coordinate axes. A right-left direction when a viewer directly faces a display surface of an image display panel is defined as an X axis direction. An up-down direction when the viewer directly faces the display surface of the image display panel is defined as a Y axis direction. In addition, a direction perpendicular to the display surface of the image display panel is defined as a Z axis direction. Here, "directly facing"

means that the viewer is located directly in front of the display surface such that, for example, when a letter of "A" is displayed on the display surface, the viewer sees the letter of "A" from a correct direction.

Embodiment 1

Hereinafter, Embodiment 1 will be described with reference to FIGS. 1 to 6.

FIG. 1 is a schematic cross-sectional view of an image display apparatus 11 according to the present embodiment, and FIG. 2 is a front view showing a relationship between an image display panel 60 (an image display section) and a parallax barrier 40 (a light control section) shown in FIG. 1. FIG. 1 corresponds to a view as seen from above the image display apparatus 11. Thus, the left side in FIG. 1 corresponds to the right side of a display screen when a viewer sees the display screen.

As shown in FIG. 1, the image display apparatus 11 includes a backlight 20, the image display panel 60, the parallax barrier 40, and a display control section 65 that controls the image display panel 60. Light emitted from the backlight 20 is incident on the image display panel 60. The light incident on the image display panel 60 is emitted to the parallax barrier 40 side.

Hereinafter, each component will be described in detail.

The backlight 20 includes a light source 21, a reflection film 22, a light guide plate 23 having inclined surfaces 24, a diffusion sheet 25, a prism sheet 26, and a polarization reflection sheet 27. The reflection film 22 is provided at a back surface side (a lower surface side in FIG. 1) of the light guide plate 23, and the diffusion sheet 25 is provided at a front surface side (an upper surface side in FIG. 1) of the light guide plate 23.

The light source 21 is arranged along one side surface of the light guide plate 23. The light source 21 includes, for example, a plurality of LED elements arranged in the Y axis direction.

Light emitted from the light source 21 spreads within the light guide plate 23 while being repeatedly totally reflected at the front surface and the back surface of the light guide plate 23. Light having an angle surpassing the total reflection angle within the light guide plate 23 is emitted from the front surface of the light guide plate 23. A plurality of inclined surfaces 24 are provided at the back surface of the light guide plate 23 as shown in FIG. 1. By these inclined surfaces 24, light propagating within the light guide plate 23 is reflected in various directions, and thus the intensity of the light emitted from the light guide plate 23 becomes uniform across the entire front surface.

The reflection film 22 is provided at the back surface side of the light guide plate 23. Light having an angle surpassing the total reflection angles of the inclined surfaces 24 provided at the back surface of the light guide plate 23 is reflected on the reflection film 22, enters the light guide plate 23 again, and is eventually emitted from the front surface. The light emitted from the front surface of the light guide plate 23 is incident on the diffusion sheet 25.

The diffusion sheet 25 is a film-like member having minute projections and recesses provided on its surface, and the thickness thereof is about 0.1 to 0.3 mm. The diffusion sheet 25 is provided in order to further uniformize the intensity of the light emitted from the front surface of the light guide plate 23, in the plane direction. A diffusion plate having a plurality of beads therein may be used instead of the diffusion sheet 25. The diffusion plate is thicker than the diffusion sheet 25, and thus has a great effect of spreading light in the plane direction therein. Meanwhile, the diffusion sheet 25 has a small effect of spreading light in the plane direction since the diffusion sheet 25 is thinner than the diffusion plate, but the diffusion sheet 25 is able to scatter light by the projections and the recesses on its surface. In addition, use of the diffusion sheet 25 also allows reduction in the thickness of the image display apparatus 11 in the Z axis direction.

The prism sheet 26 is formed by providing a countless number of minute prism arrays on one surface of a transparent film. The prism sheet 26 reflects some light and transmits the other light. The prism sheet 26 has relatively strong directivity in the normal direction of a flat surface of the prism sheet and converges incident light in the front surface direction of the prism sheet 26. Thus, the prism sheet 26 brightly illuminates in an effective direction with a small amount of light.

The polarization reflection sheet 27 is a member specific to a backlight for a liquid crystal panel, transmits light of a component in a polarization direction that the image display panel 60, which is a liquid crystal panel, transmits (a transmitted and polarized component), and reflects the other components. The reflected light becomes unpolarized when being reflected on another optical member or the reflection film 22 provided on the back surface of the light guide plate 23, and is incident on the polarization reflection sheet 27 again. Of the re-incident light, the transmitted and polarized component passes through the polarization reflection sheet 27. By repeating this, polarized components of the light emitted from the backlight 20 are uniformed as polarized components used effectively in the image display panel 60 and are emitted to the image display panel 60 side.

As shown in FIG. 2, the image display panel 60 has partition regions forming a plurality of pixels partitioned in a row direction (X axis direction) and a column direction (Y axis direction) by a grid-shaped black matrix 61. Each of the partition regions forms one sub-pixel 62. A plurality of sub-pixels 62 (e.g., three sub-pixels 62 of red, green, and blue) form one pixel. It should be noted that in the case of an image display apparatus performing monochromatic display, each partition region forms one pixel. The black matrix 61 forms a plurality of partition regions by first black lines 61a extending in the column direction and second black lines 61b extending in the row direction. In the black matrix 61, a plurality of the first black lines 61a are arranged in the row direction, for example, at regular pitches, and a plurality of the second black lines 61b are arranged in the column direction, for example, at regular pitches. A plurality of the sub-pixels 62 are arranged in a matrix manner in the row direction (the right-left direction in FIG. 2) and the column direction (the up-down direction in FIG. 2). The image display panel 60 is capable of displaying a 2D image or a 3D image in accordance with control by the display control section 65. An example of the image display panel 60 is a liquid crystal panel using the In-Plane-Switching mode. It should be noted that a liquid crystal panel of another mode, an organic EL panel, or the like may also be used as the image display panel 60.

When a 3D image is displayed on the image display panel 60, the plurality of pixels are divided into right eye pixels and left eye pixels and used. In displaying the 3D image, the display control section 65 displays a right eye image at the right eye pixels and displays a left eye image at the left eye pixels. In other words, in displaying the 3D image, the right eye image and the left eye image are simultaneously displayed on the image display panel 60. Light of a right eye image displayed at the right eye pixels is shielded by the later-described parallax barrier 40, and light of a left eye image displayed at the left eye pixels reaches the left eye of a viewer. In addition, the light of the left eye image displayed at the left eye pixels is shielded by the later-described parallax barrier 40, and the light of the right eye image displayed at the right eye pixels reaches the right eye of the viewer.

Meanwhile, in displaying a 2D image, the display control section 65 displays one 2D image using all the pixels as in the conventional art.

Although not shown, a sheet for uniforming polarization of light is formed on each of the incident surface and the emission surface of the image display panel 60. Here, in the present embodiment, a polarization direction of light emitted from the image display panel 60 is the Y axis direction.

The parallax barrier 40 is arranged at the front surface side of the image display panel 60 and includes a plurality of light shielding portions 41 arranged in a stripe manner (in a slit manner) as shown in FIG. 2. Between the adjacent light shielding portions 41, an opening 42 is formed through which the light emitted from the image display panel 60 is transmitted. Each light shielding portion 41 shields light of a right eye image emitted from the image display panel 60, from the line-of-sight range of the left eye of the viewer, and shields light of a left eye image emitted from the image display panel 60, from the line-of-sight range of the right eye of the viewer. As a result, the light of the right eye image and the light of the left eye image reach the right eye and the left eye of the viewer through the openings 42, respectively. In addition, as shown in FIG. 2, the light shielding portions 41 and the openings 42 are formed so as to extend linearly and so as to be tilted with respect to the column direction (with respect to pixel columns). The light shielding portions 41 and the openings 42 are arranged so as to extend linearly and so as to be tilted with respect to the column direction (i.e., the direction in which each first black line 61*a* extends). The parallax barrier 40 can be realized, for example, by using a liquid crystal element that displays a plurality of light shielding portions 41 in a stripe manner in accordance with application of a voltage thereto. In addition, in an image display apparatus dedicated for displaying a 3D image, the parallax barrier 40 may be a stripe-like pattern formed by using a light shielding material such as black ink or the like. It should be noted that pairs of the light shielding portions 41 and the openings 42 are an example of separation elements that separate the light of the right eye image and the light of the left eye image emitted from the image display panel 60 and guides the respective separated light to the right eye and the left eye of the viewer. In addition, the parallax barrier 40 is an example of a light control section that applies parallax to the light emitted from the image display panel 60.

Here, the parallax barrier 40 is configured such that an arrangement pitch P1 of each light shielding portion 41 and each opening 42 in the row direction (the X axis direction) is non-integer times (note that it is greater than 2 times but less than 4.5 times) that of an arrangement pitch P2 of each sub-pixel 62 in the row direction. A non-integer is a number that is not an integer. It should be noted that the arrangement pitch P1 of each separation element (a pair of the light shielding portion 41 and the opening 42) is constant in the row direction (pixel row direction).

Since the arrangement pitch P1 of each light shielding portion 41 and each opening 42 in the row direction is non-integer times that of the arrangement pitch P2 of each sub-pixel 62 in the same direction, it is possible to reduce moiré that occurs when a viewing position is deviated from a most appropriate viewing position while a 3D image is displayed. Hereinafter, an effect of reducing moiré according to the present embodiment will be described in detail in comparison to comparative examples.

FIGS. 3 and 4 are front views showing relationships between image display panels 60 and parallax barriers 140 and 240 in image display apparatuses 101 and 201 according to Comparative Examples 1 and 2, respectively.

The image display apparatus 101 shown in FIG. 3 is configured with the parallax barrier 140 and the image display panel 60 that is the same as that included in the image display apparatus 11 according to Embodiment 1. Similarly to the parallax barrier 40 shown in FIG. 2, the parallax barrier 140 includes a plurality of light shielding portions 141 arranged in a stripe manner, and an opening 142 through which light is transmitted is provided between the adjacent light shielding portions 141. It should be noted that the light shielding portions 141 are formed so as to extend parallel to the column direction.

The image display apparatus 201 shown in FIG. 4 is configured with the parallax barrier 240 and the image display panel 60 that is the same as that included in the image display apparatus 11 according to Embodiment 1. Similarly to the parallax barrier 40 shown in FIG. 2, the parallax barrier 240 includes a plurality of light shielding portions 241 arranged in a stripe manner, and an opening 242 through which light is transmitted is provided between the adjacent light shielding portions 241. In addition, similarly to the example of FIG. 2, the light shielding portions 241 and the openings 242 are formed so as to be tilted with respect to the column direction. However, the parallax barrier 240 in FIG. 4 is different from the parallax barrier 40 in FIG. 2 in that an arrangement pitch P3 of each light shielding portion 241 and each opening 242 in the row direction is integer times that of the arrangement pitch P2 of each sub-pixel 62.

FIG. 5 is a diagram showing a pattern of a black matrix seen through the openings 42 of the parallax barrier 40 when the image display apparatus 11 according to Embodiment 1 is seen.

In the image display apparatus 11 according to Embodiment 1 (FIG. 2), a region in which the first black line 61*a* of the black matrix 61 is seen at substantially the center of the opening 42 and a region in which the sub-pixel 62 is seen at substantially the center of the opening 42, as shown in (a) of FIG. 5, are present. Furthermore, a region in which the first black line 61*a* is seen displaced from the center of the opening 42 depending on a position on the display area of the image display apparatus 11 and a region in which the sub-pixel 62 is seen displaced from the center of the opening 42 depending on a position on the display area of the image display apparatus 11, as shown in (b) of FIG. 5, are present. In these regions, the appearance of the first black lines 61*a* is different. Thus, when the brightness of each sub-pixel 62 is the same, a region in which the sub-pixel 62 is located at the center of the opening 42 is relatively bright, and a region in which the first black line 61*a* is located at the center of the opening 42 is relatively dark. It should be noted that each of (a) and (b) of FIG. 5 is a pattern of the black matrix 61 that appears in both the case where the image display apparatus 11 is seen from an appropriate viewing distance and the case where the image display apparatus 11 is seen from a distance deviated from the appropriate viewing distance.

FIG. 6 is a diagram showing a pattern of a black matrix seen through the openings 142 of the parallax barrier 140 when the image display apparatus 101 according to Comparative Example 1 is seen.

In the image display apparatus 101 according to Comparative Example 1, when the image display apparatus 101 is seen from an appropriate viewing distance, the pattern of the black matrix 61 shown in (a) of FIG. 6 appears on the entirety of the screen. At the time of viewing from the appropriate viewing distance, the black matrix 61 and the openings 142 have a positional relation shown in (a) of FIG. 6 on the entirety of the screen. Thus, when the brightness of each sub-pixel 62 is the same, the entirety of the screen has substantially uniform brightness. However, when the viewing distance of the viewer is deviated from the appropriate viewing distance, the pattern of the black matrix 61 seen through the openings 142 is changed due to a change in the line-of-sight range. As a result, a region in which the first black line 61a is seen at substantially the center of the opening 142 as shown in (b) of FIG. 6 appears on a part of the screen. When the brightness of each sub-pixel 62 is the same, the region shown in (b) of FIG. 6 looks relatively dark as compared to the region shown in (a) of FIG. 6.

FIG. 7 is a diagram shown a pattern of a black matrix seen through the openings 242 of the parallax barrier 240 when the image display apparatus 201 according to Comparative Example 2 is seen.

In the image display apparatus 201 according to Comparative Example 2, also as shown in FIG. 4, when the image display apparatus 201 is seen from an appropriate viewing distance, a region in which the sub-pixel 62 is seen at substantially the center of the opening 242 as shown in (a) of FIG. 7 and a region in which the first black line 61a is seen at substantially the center of the opening 242 as shown in (b) of FIG. 7, appear. In addition, also when the viewing distance is deviated from the appropriate viewing distance, the region shown (a) of FIG. 7 and the region shown in (b) of FIG. 7 appear. When the brightness of each sub-pixel 62 is the same, the region shown in (a) of FIG. 7 looks relatively bright, and the region shown in (b) of FIG. 7 looks relatively dark.

Figure 9:
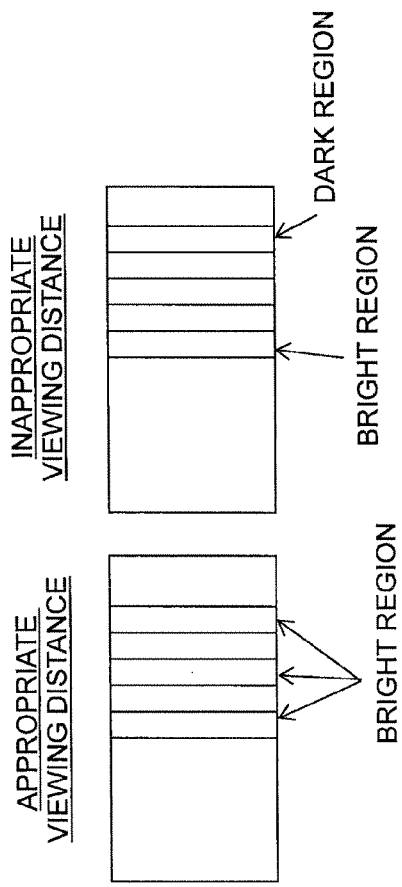
FIG. 9 is a schematic diagram showing a brightness distribution appearing on a display surface of the image display apparatus according to Comparative Example 1.
Figure 10:
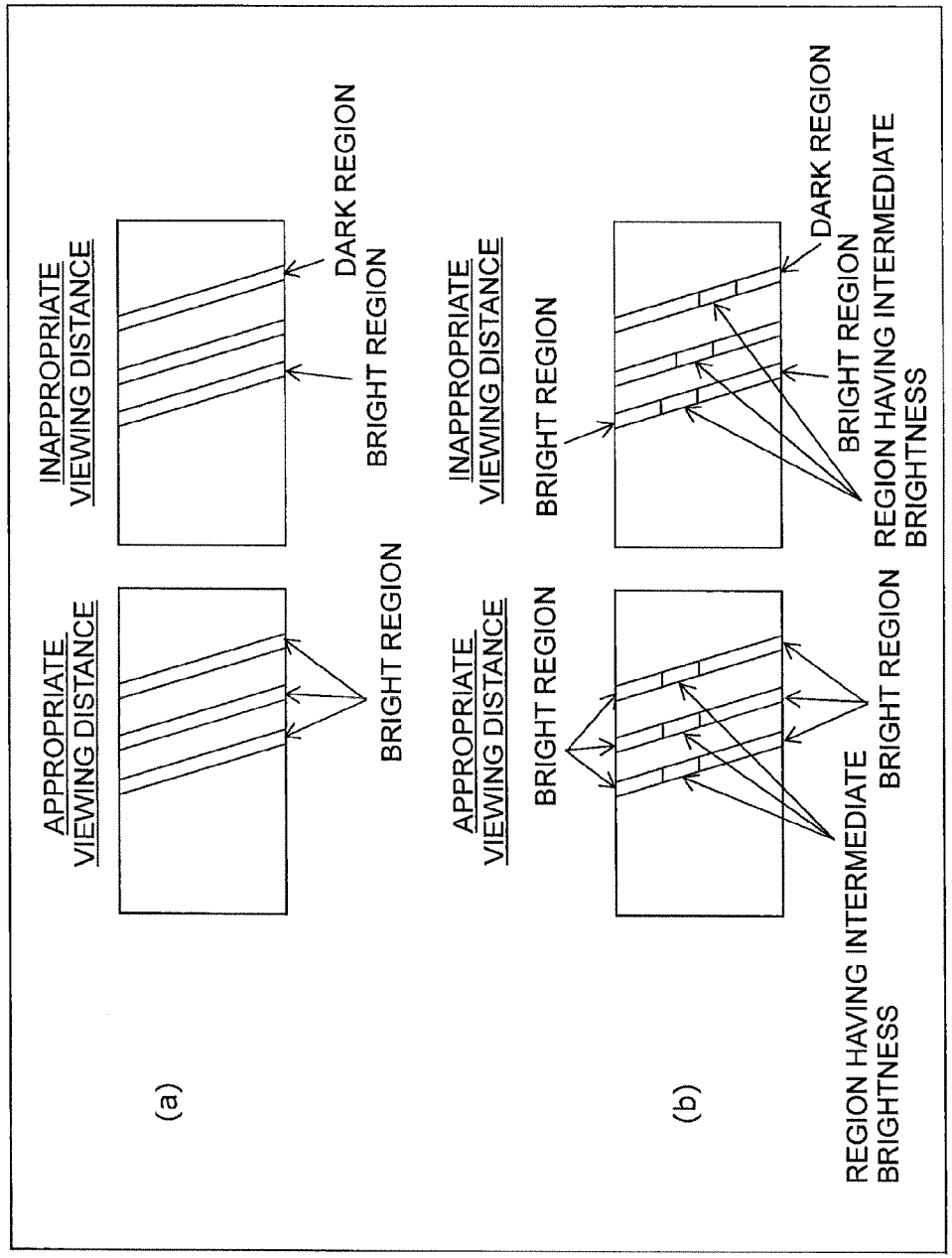
FIG. 10 is a schematic diagram showing a brightness distribution appearing on a display surface of the image display apparatus according to Comparative Example 2.

FIG. 8 is a schematic diagram showing a brightness distribution appearing on a display surface of the image display apparatus 11 according to Embodiment 1, and FIGS. 9 and 10 are schematic diagrams showing brightness distributions appearing on display surfaces of the image display apparatuses 101 and 201 according to Comparative Examples 1 and 2, respectively. In FIGS. 8 to 10, the left part shows a brightness distribution seen when a 3D image is viewed at an appropriate viewing distance at which crosstalk is the smallest, and the right part shows a brightness distribution seen when the viewer comes close to the screen and views a 3D image at a distance shorter than the appropriate viewing distance. In addition, in FIGS. 8 to 10, the brightness is nearly uniform in each band-like region. In FIGS. 8 to 10, a region that looks relatively bright (a bright region), a region that looks relatively dark (a dark region), or a region whose brightness is an intermediate brightness between the region that looks relatively bright and the region that looks relatively dark (a region having an intermediate brightness) is indicated by a band-like region. In addition, (a) of FIG. 10 shows the case where the tilt of each light shielding portion 241 is great, and (b) of FIG. 10 shows the case where the tilt of each light shielding portion 241 is small.

The case will be assumed in which the viewing position of the viewer is deviated from the appropriate viewing position and, for example, comes close to the image display apparatus 11, 101, or 201. When the viewing distance is shorter than the appropriate viewing distance, the line-of-sight ranges of the right eye and the left eye of the viewer shift in the right-left direction. Therefore, when the viewing distance is deviated from the appropriate viewing distance, the pattern of the black matrix 61 seen through the openings 42, 142, or 242 is changed. Thus, the brightness distribution seen on the screen is changed, for example, a region that looks relatively bright at the appropriate viewing distance looks dark, or a region that looks relatively dark at the appropriate viewing distance looks bright.

However, in Embodiment 1, since the light shielding portions 41 and the openings 42 are arranged so as to be tilted with respect to the column direction (with respect to the pixel columns) and the arrangement pitch P1 of each light shielding portion 41 and each opening 42 in the row direction is non-integer times that of the arrangement pitch P2 of each sub-pixel 62 in the row direction, when the arrangement pitch P1 is half-integer times (e.g., 2.5 times or 3.5 times) that of the arrangement pitch P2, the openings 42 having different brightnesses as shown in FIG. 5 are arranged on the display area of the image display apparatus 11 alternately in the row direction. When the arrangement pitch P1 is non-integer times that of the arrangement pitch P2 and not half-integer times that of the arrangement pitch P2, the openings 42 having different brightnesses are arranged on the display area of the image display apparatus 11 randomly in the row direction. In both of these cases, the openings 42 having similar brightnesses are not biased in the row direction, and regions having different brightnesses are not periodically arranged as regions each having a size recognized visually by the viewer. In addition, even when the viewing distance of the viewer is deviated from the appropriate viewing distance, the position of each region seen with the same brightness as that at the time of viewing at the appropriate viewing distance is merely changed as shown in FIG. 8, and the state is maintained in which the openings 42 having different brightnesses appear alternately or randomly in the row direction. Therefore, in the image display apparatus 11 according to Embodiment 1, regardless of the viewing distance, regions having different apparent brightnesses are not periodically arranged, and thus moiré is less likely to be visually recognized.

To the contrary, in the image display apparatus 101 according to Comparative Example 1, when the image display apparatus 101 is seen from the appropriate viewing distance, the pattern of the black matrix 61 is seen over the entirety of the screen as shown in (a) of FIG. 6, and thus the brightness is substantially uniform over the entirety of the screen. However, when the viewing distance is deviated from the appropriate viewing distance, the pattern of the black matrix 61 as shown in (b) of FIG. 6 appears. As a result, a region that looks dark as compared to that when being seen from the appropriate viewing distance appears on the screen. In Comparative Example 1, since the light shielding portions 141 and the openings 142 are arranged parallel to the column direction, a dark region that occurs with a change in viewing distance occurs along the column direction as shown in FIG. 9. Such a change in brightness in the column direction is visually recognized as vertically striped moiré.

In addition, in the image display apparatus 201 according to Comparative Example 2, the light shielding portions 241 and the openings 242 are arranged so as to be tilted with respect to the column direction, but the arrangement pitch P3 of each light shielding portion 241 and each opening 242 in the row direction is integer times that of the arrangement pitch P2 of each sub-pixel 62 in the row direction. Thus, relatively bright regions ((a) of FIG. 7) and relatively dark regions ((b) of FIG. 7) periodically appear as shown in (a) and (b) of FIG. 10. As a result, also in the image display apparatus 201 according to Comparative Example 2, with a change in viewing distance at the time of viewing a 3D image, vertically or horizontally striped moiré is visually recognized. It should be noted that in the case where the tilt of the light shielding portions 41 and the openings 42 with respect to the column direction is small, even when viewing is performed from the appropriate viewing position, a periodical brightness distribution may occur as shown in (b) of FIG. 10, and moiré may be visually recognized. In this case, when the viewing distance is deviated from the appropriate viewing distance, the position of each region seen with the same brightness as that at the time of viewing at the appropriate viewing distance is changed, but the periodical brightness distribution is still maintained and thus moiré is visually recognized.

For such reasons, in the present embodiment, since the arrangement pitch P1 of each light shielding portion 41 and each opening 42 in the row direction (the right-left direction as seen from the viewer) is non-integer times that of the arrangement pitch P2 of each sub-pixel 62 in the row direction, when the viewing distance of the viewer is deviated from the appropriate viewing distance, it is possible to suppress occurrence of moiré.

In addition, the arrangement pitch P1 of each light shielding portion 41 and each opening 42 in the row direction is non-integer times that of the arrangement pitch P2 of each sub-pixel 62 in the row direction and is set so as to be less than 4.5 times that of the arrangement pitch P2. The reason for this will be described below.

Figure 11:
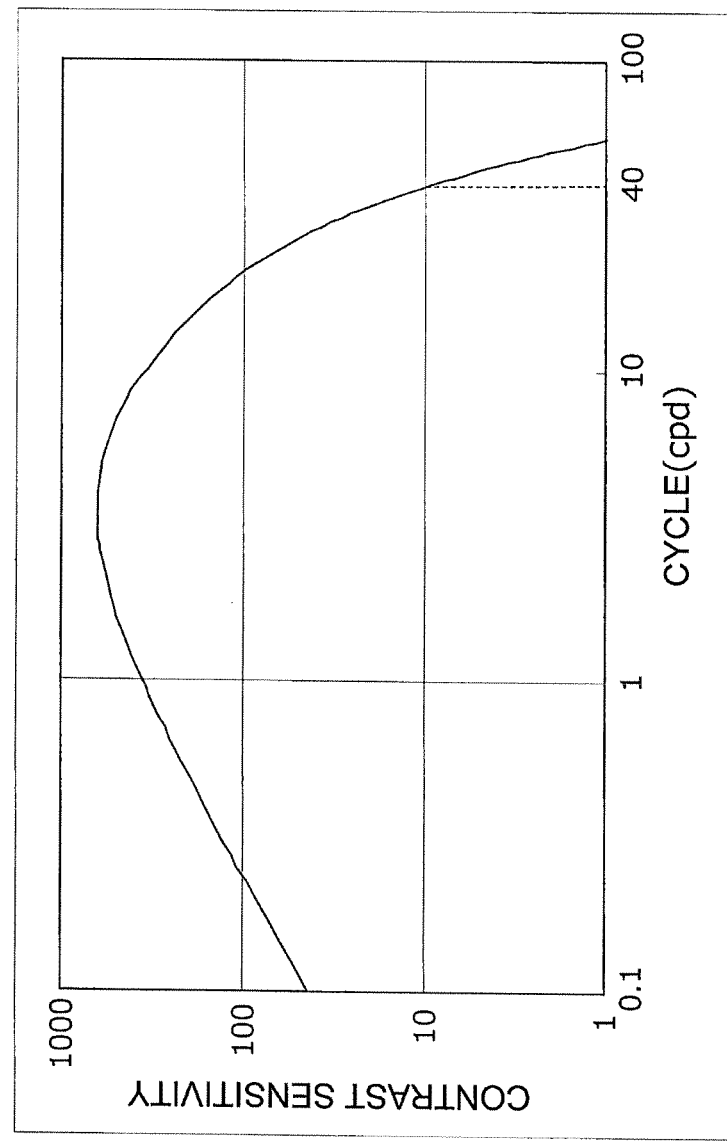
FIG. 11 is a graph showing a spatial frequency characteristic of the human contrast sensitivity.

FIG. 11 is a graph showing a spatial frequency characteristic of the human contrast sensitivity. In FIG. 11, the horizontal axis indicates a spatial frequency, namely, the number of cycles of stripes per one degree of a viewing angle (unit: cpd (cycle per degree)), and the vertical axis indicates a contrast sensitivity, namely, the reciprocal of a contrast threshold that is a minimum contrast in which stripes are identifiable, when the contrast of a stripe-like pattern is changed.

In the present embodiment, the arrangement pitch P1 of each light shielding portion 41 and each opening 42 of the parallax barrier 40 is set on the basis of the spatial frequency characteristic of the human contrast sensitivity. The parallax barrier 40 described in the present embodiment is an element in which the contrast between the light shielding portions 41 and the openings 42 is 1. As described later, a liquid crystal lens or a cylindrical lens may be used instead of the parallax barrier 40, but the contrast of the lens is about 1/10. Therefore, in the case where an image display apparatus is configured with a lens as a light control section that applies parallax to light of a right eye image and light of a left eye image, the value of the arrangement pitch P1 is set such that the lens is not visually recognized as stripes. When the contrast sensitivity of the lens is assumed as 10, in order to prevent the lens from being visually recognized, the spatial frequency of the stripe-like pattern of the lens may be larger than 40 (i.e., the arrangement pitch P1 may be decreased) as shown in FIG. 11.

Meanwhile, the arrangement pitch P2 of each sub-pixel 62 of the image display panel 60 is set such that the spatial frequency of a stripe-like pattern formed per column of three sub-pixels is larger than 60 cpd, in order to prevent three continuous sub-pixels 62 from being identified as pixels at the time of viewing from the appropriate viewing position (i.e., in order that three sub-pixels 62 of red, green, and blue or the like are seen as one pixel).

Here, it is calculated how many times that of the arrangement pitch P2 of each sub-pixel 62 the arrangement pitch P1 of each light shielding portion 41 and each opening 42 is in the case where the spatial frequency of the light shielding portions 41 and the openings 42 is 40 cpd. The spatial frequency, 40 cpd, of the stripe-like pattern composed of the light shielding portions 41 and the openings 42 is 2/3 times that of the spatial frequency, 60 cpd, of the stripe-like pattern composed of three continuous sub-pixels 62, and thus the arrangement pitch P1 of each light shielding portion 41 and each opening 42 is larger than the arrangement pitch (3×P2) of the three continuous sub-pixels 62 and is 3/2 times thereof. Therefore, in order to make the spatial frequency of the light shielding portions 41 and the opening 42 larger than 40 cpd, the arrangement pitch P1 of each light shielding portion 41 and the opening 42 may be smaller than 3×P2× (3/2), namely, 4.5×P2.

For such a reason, the arrangement pitch P1 of each light shielding portion 41 and each opening 42 in the row direction is non-integer times, less than 4.5 times, that of the arrangement pitch P2 of each sub-pixel 62 in the row direction.

In addition, the arrangement pitch P1 of each light shielding portion 41 and each opening 42 in the row direction is preferably half-integer times (note that it is less than 4.5 times) that of the arrangement pitch P2 of each sub-pixel 62 in the row direction. Here, a half-integer refers to ½ of an odd number. In the case where the arrangement pitch P1 of each light shielding portion 41 and each opening 42 in the row direction is half-integer times that of the arrangement pitch P2 of each sub-pixel 62 in the row direction, the openings 42 having different brightnesses appear alternately in the row direction over the entirety of the screen as shown in FIG. 2, and moiré is further less likely to be visually recognized when a 3D image is viewed at a position deviated from the appropriate viewing distance. Thus, this case is beneficial. However, when the arrangement pitch P1 of each light shielding portion 41 and each opening 42 is non-integer times that of the pitch P2 of each sub-pixel 62, visual recognition of moiré when a 3D image is viewed at a position deviated from the appropriate viewing distance is sufficiently reduced as compared to the case where the arrangement pitch P1 of each light shielding portion 41 and each opening 42 is integer times that of the pitch P2 of each sub-pixel 62. Thus, the arrangement pitch P1 may not necessarily be half-integer times that of the arrangement pitch P2.

It should be noted that in order to provide right eye pixels and left eye pixels between the adjacent light shielding portions 41, the arrangement pitch P1 of each light shielding portion 41 and each opening 42 in the row direction is set so as to be larger than 2 times that of the arrangement pitch P2 of each sub-pixel 62 in the row direction.

As described above, in the image display apparatus 11 according to the present embodiment, since the arrangement pitch P1 of each light shielding portion 41 and each opening 42 of the parallax barrier 40 is non-integer times that of the arrangement pitch P2 of each sub-pixel 62, the openings 42 having different brightnesses appear alternately or randomly in the row direction over the entirety of the screen. Thus, even when the viewing position of the viewer is deviated from the appropriate viewing position and the line-of-sight range of the viewer shifts while a 3D image is displayed, the openings 42 having different brightnesses appear alternately or randomly in the row direction over the entirety of the screen, and hence it is possible to suppress visual recognition of moiré by the viewer. Therefore, according to the present embodiment, deterioration of the quality of a 3D image is reduced even when the viewing distance is changed, and hence it is possible to realize the image display apparatus 11 having good quality of a 3D image.

Embodiment 2

Figure 12:
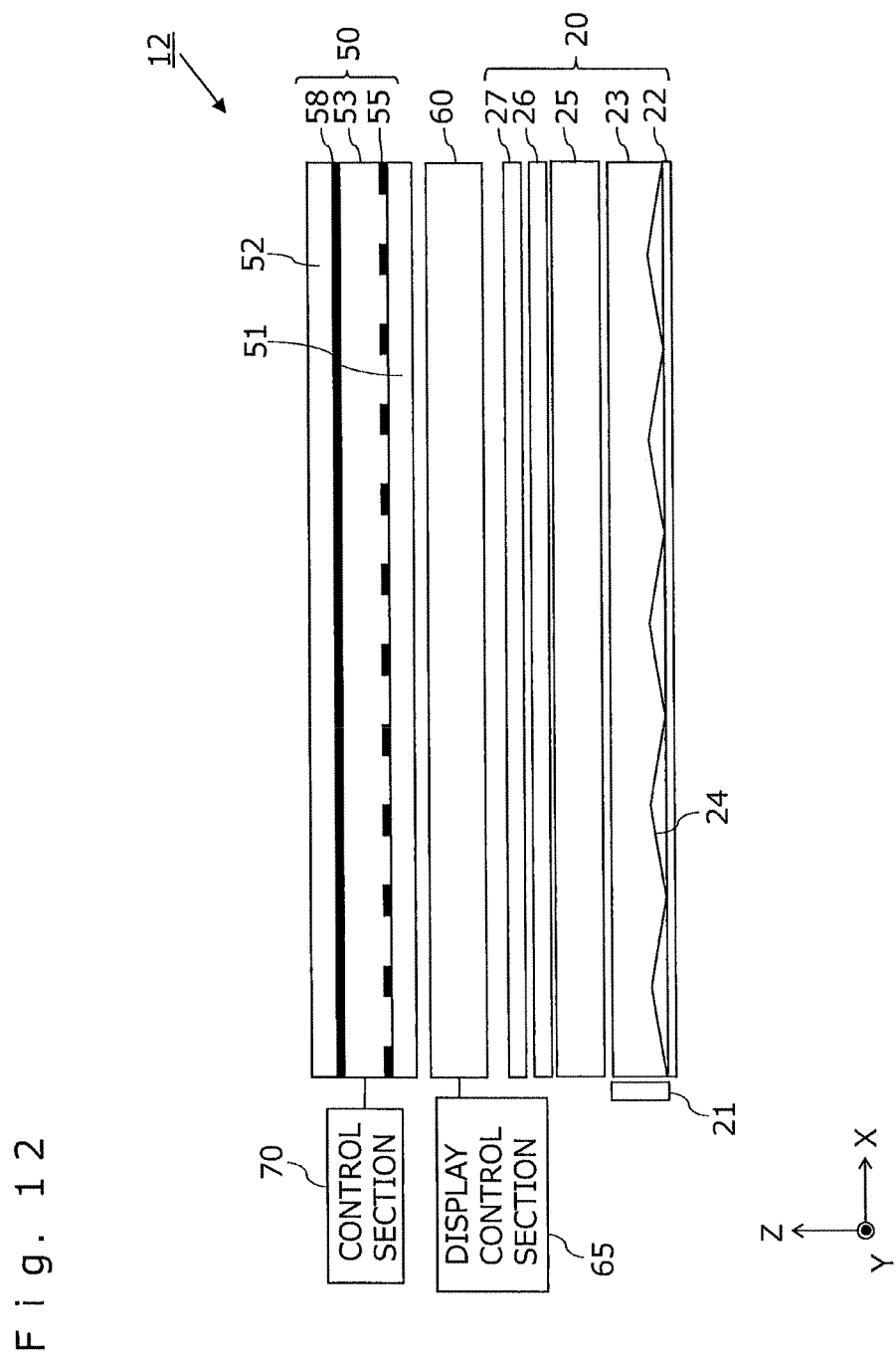
FIG. 12 is a schematic configuration diagram of an image display apparatus according to Embodiment 2.
Figure 13:
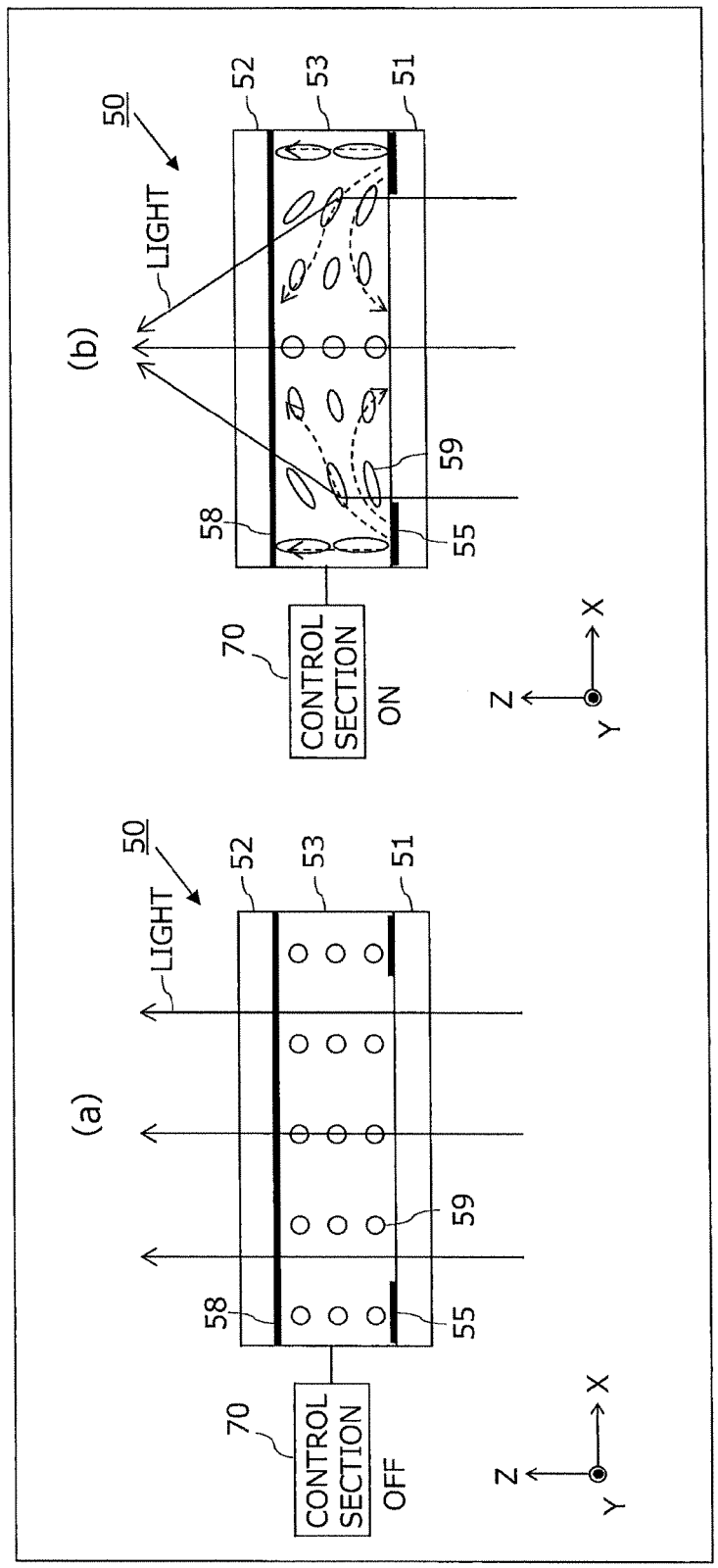
FIG. 13 is a diagram showing change in orientation of liquid crystal molecules in a liquid crystal lens shown in FIG. 12.
Figure 14:
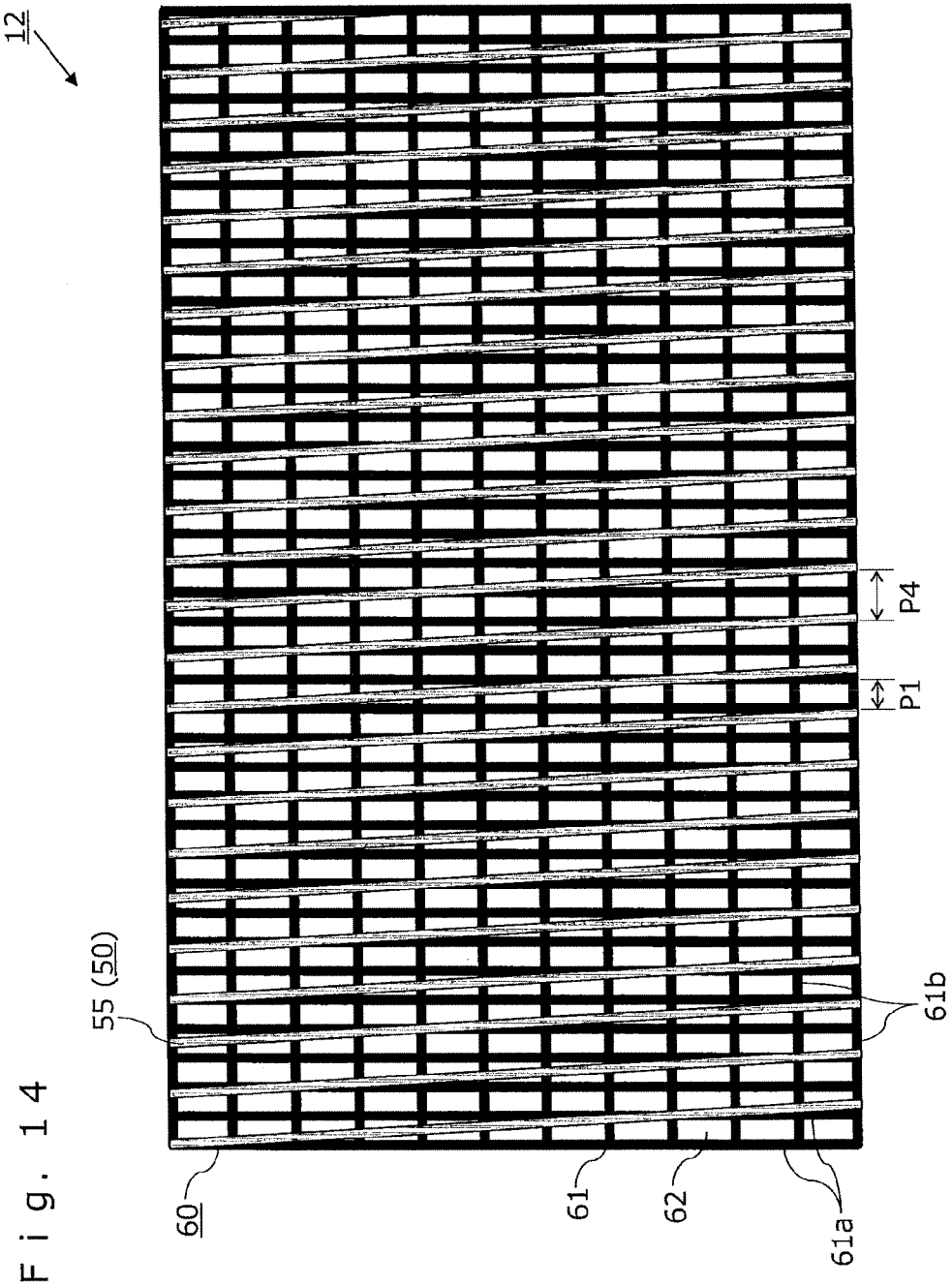
FIG. 14 is a front view showing a relationship between an image display panel and second electrodes of the liquid crystal lens shown in FIG. 12.

FIG. 12 is a schematic configuration diagram of an image display apparatus 12 according to Embodiment 2, FIG. 13 is a diagram showing change in orientation of liquid crystal molecules 59 in a liquid crystal lens 50 shown in FIG. 12, and FIG. 14 is a front view showing a relationship between an image display panel 60 and second electrodes 55 of the liquid crystal lens 50 shown in FIG. 12.

The image display apparatus 12 according to the present embodiment includes a backlight 20, the image display panel 60, the liquid crystal lens 50, a display control section 65 that controls the image display panel 60, and a control section 70 that controls the liquid crystal lens 50. Light emitted from the backlight 20 is incident on the image display panel 60. The light incident on the image display panel 60 is emitted to the liquid crystal lens 50 side. It should be noted that the backlight 20, the image display panel 60, and the display control section 65 are the same as those described in Embodiment 1 and thus the repeated description is omitted.

The liquid crystal lens 50 is an optical element that guides light of a right eye image displayed on the image display panel 60 to the right eye of a viewer and guides light of a left eye image displayed on the image display panel 60 to the left eye of the viewer in displaying a 3D image. The liquid crystal lens 50 includes a first electrode 58, a plurality of second electrodes 55 arranged in a stripe manner (in a slit manner), and a liquid crystal layer 53 provided between a layer in which the first electrode 58 is formed and a layer in which the plurality of second electrodes 55 are formed. In the present embodiment, the liquid crystal layer 53 is sealed between a substrate 52 at the front surface side and a substrate 51 at the back surface side. The first electrode 58 is formed on the back surface of the substrate 52, and each second electrode 55 is formed on the front surface of the substrate 51. The liquid crystal lens 50 can be produced by attaching together the substrate 51 on which the first electrode 58 has been formed and the substrate 52 on which each second electrode 55 has been formed, such that a liquid crystal is enclosed between the substrate 51 and the substrate 52. It should be noted that orientation films which are not shown are formed on the light emission surface of the substrate 51 and the light incident surface of the substrate 52. Each orientation film orients the liquid crystal molecules 59 such that the long axes of the liquid crystal molecules 59 are substantially parallel to the Y axis direction in a state where no voltage is applied between the first electrode 58 and each second electrode 55 as shown in (a) of FIG. 13. However, the orientation films may not be provided if the orientation of the liquid crystal molecules 59 can be kept uniform. Glass may be used as the materials of the substrates 51 and 52.

The first electrode 58 is a single plane electrode provided on substantially the entirety of the inner surface of the substrate 52. Meanwhile, the plurality of second electrodes 55 are provided on the inner surface of the substrate 51 in a stripe manner (in a slit manner) and face the first electrode 58. Each second electrode 55 is formed so as to extend in an oblique direction with respect to the column direction (with respect to the pixel columns) as shown in FIG. 14. Each second electrode 55 is formed so as to extend in an oblique direction with respect to the first black lines 61a. The plurality of second electrodes 55 are arranged, for example, at regular pitches repeatedly in the row direction (X axis direction) so as to be spaced apart from each other at determined intervals. An arrangement pitch P4 of each of a plurality of lens portions P formed within the liquid crystal layer 53 when a voltage is applied to the liquid crystal lens 50 is determined by an arrangement pitch of each second electrode 55 in the X axis direction. It should be noted that it is possible to apply a voltage independently to each of the second electrodes 55.

The control section 70 switches a value of a voltage applied to the liquid crystal lens 50 such that the value is different between in displaying a 2D image and in displaying a 3D image. In displaying a 3D image, the control section 70 applies a determined voltage to the liquid crystal layer 53 such that the liquid crystal lens 50 has a lens effect. In addition, in displaying a 2D image, the control section 70 controls a voltage such that the liquid crystal lens 50 does not exert a lens effect.

Figure 15:
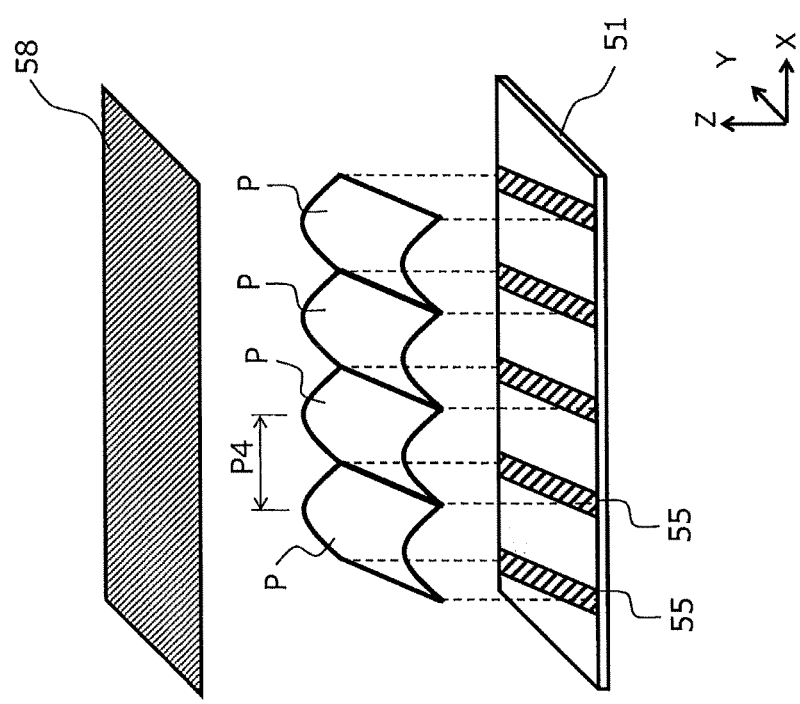
FIG. 15 is an exploded perspective view of the liquid crystal lens shown in FIG. 12.

In a state where no voltage is applied between the first electrode 58 and each second electrode 55, the liquid crystal molecules 59 are oriented such that the long axes thereof are substantially parallel to the Y axis as shown in (a) of FIG. 13. When a voltage is applied between the first electrode 58 and each second electrode 55, the orientation of the liquid crystal molecules 59 is changed in accordance with an electric field generated within the liquid crystal layer 53 as shown in (b) of FIG. 13, a refractive index distribution occurs within the liquid crystal layer 53, and the liquid crystal layer 53 serves as a lens portion due to the refractive index distribution. It should be noted that the refractive index distribution within the liquid crystal layer 53 occurs in the direction in which each second electrode 55 extends, and thus a plurality of cylindrical lens portions P tilted with respect to the column direction occurs within the liquid crystal layer 53 due to the application of the voltage as shown in FIG. 15. One lens portion P appears between the adjacent second electrodes 55. It should be noted that each lens portion P that occurs when the voltage is applied is an example of a separation element that separates light of a right eye image and light of a left eye image emitted from the image display panel 60 and guides the respective separated light to the right eye and the left eye of the viewer. An arrangement pitch of each separation element in the row direction is the arrangement pitch P4 of each lens portion P in the row direction. The arrangement pitch of each lens portion P in the row direction is equal to the arrangement pitch of each second electrode 55 in the row direction. In addition, the liquid crystal lens 50 is an example of a light control section that applies parallax to light emitted from the image display panel 60. It should be noted that FIG. 15 is an exploded perspective view of the liquid crystal lens 50. In FIG. 15, for convenience of explanation, illustration of the substrate 52 and the liquid crystal layer 53 is omitted, and virtual lenses P are shown instead of the liquid crystal layer 53.

By controlling the applied voltage in this manner, in displaying a 2D image, light emitted from the image display panel 60 reaches the eyes of the viewer while the light distribution characteristics of the light are kept unchanged even when the light passes through the liquid crystal lens 50. Meanwhile, in displaying a 3D image, light emitted from the image display panel 60 is deflected by the liquid crystal lens 50 such that light from the right eye pixels is converged on the right eye of the viewer and light from the left eye pixels is converged on the left eye of the viewer.

Also when a 3D image is displayed on the image display apparatus 12 according to Embodiment 2, it is assumed that the viewing position of the viewer is deviated from the appropriate viewing position. When the viewing position of the viewer is deviated from the appropriate viewing position, the pattern of the black matrix 61 seen through the lens portions (cylindrical lenses) P is changed for the same reason as described in Embodiment 1. For example, when the viewing distance is made shorter than the appropriate viewing distance, the line-of-sight range at a center portion of the screen slightly widens both leftward and rightward, the line-of-sight range at the right side of the center portion of the screen shifts right, and the line-of-sight range at the left side of the center portion of the screen shifts left. When the viewing position is deviated as described above, if arrangements of apparently bright regions and apparently dark regions periodically appear in accordance with the pattern of the black matrix 61 seen through the lens portions P, the periodic arrangements are visually recognized as moiré by the viewer.

Thus, each second electrode 55 is configured such that the pitch thereof in the row direction (X axis direction) is non-integer times (note that it is greater than 2 times but less than 4.5 times) that of the arrangement pitch P1 of each sub-pixel 62 in the row direction. Therefore, the arrangement pitch P4 of each lens portion P in the row direction is non-integer times (note that it is greater than 2 times but less than 4.5 times) that of the arrangement pitch P1 of each sub-pixel 62 in the row direction.

Since the arrangement pitch of each second electrode 55 is set as described above, the lens portions P having different brightnesses appear alternately or randomly in the row direction over the entirety of the screen due to the pattern of the black matrix 61 seen through the lens portions P that occur when a voltage is applied. Thus, even when the viewing position of the viewer is deviated from the appropriate viewing position and the line-of-sight range of the viewer shifts while a 3D image is displayed, the lens portions P having different brightnesses appear alternately or randomly in the row direction over the entirety of the screen due to the pattern of the black matrix 61 seen through the lens portions P. Hence, the brightness distribution is substantially uniform over the entirety of the screen, and it is possible to suppress visual recognition of moiré by the viewer. Therefore, according to the present embodiment, deterioration of the quality of a 3D image is reduced even when the viewing distance is changed, and hence it is possible to realize the image display apparatus 12 having good quality of a 3D image.

It should be noted that in the present embodiment, the case where the liquid crystal lens 50 is provided has been described, but a lens array having a plurality of cylindrical lenses tilted with respect to the column direction (with respect to the pixel columns) may be provided instead of the liquid crystal lens 50.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An image display apparatus for displaying a 3D image, the image display apparatus comprising:
    an image display section partitioned into a plurality of pixels in a row direction and a column direction by a grid-shaped black matrix, each of the plurality of pixels including a plurality of sub-pixels;
    a display control section configured to cause the image display section to simultaneously display a right eye image and a left eye image thereon in displaying the 3D image; and
    a light control section arranged at a front surface side of the image display section and including a plurality of separation elements each configured to separate light of the right eye image and light of the left eye image emitted from the image display section in displaying the 3D image, wherein:
    each of the plurality of separation elements is arranged so as to extend linearly and so as to be tilted with respect to the column direction, and
    an arrangement pitch of the separation element in the row direction is non-integer times that of an arrangement pitch of the plurality of sub-pixels in the row direction, the non-integer times being greater than 2 times and less than 4.5 times.

2. The image display apparatus according to claim 1, wherein the arrangement pitch of the separation element in the row direction is half-integer times that of the arrangement pitch of the plurality of sub-pixels in the row direction.

3. The image display apparatus according to claim 1, wherein a number of sub-pixels in each of the plurality of pixels is three.

* * * * *